United States Patent
Von Cavallar et al.

(10) Patent No.: US 10,789,604 B2
(45) Date of Patent: Sep. 29, 2020

(54) SYSTEM, METHOD AND COMPUTER PROGRAM PRODUCT FOR REALITY AUGMENTING TOWARDS A PREDEFINED OBJECT

(71) Applicant: International Business Machines Corporation, Armonk, NY (US)

(72) Inventors: Stefan Von Cavallar, Sandringham (AU); Timothy Michael Lynar, Melbourne (AU); Jorge Andres Moros Ortiz, Carlton (AU); John Michael Wagner, Plainville, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 15/248,679

(22) Filed: Aug. 26, 2016

(65) Prior Publication Data
US 2018/0060891 A1   Mar. 1, 2018

(51) Int. Cl.
G06Q 30/02 (2012.01)
G06Q 30/06 (2012.01)
G06Q 10/06 (2012.01)
G06F 1/16 (2006.01)
G06F 16/901 (2019.01)
G06F 16/2457 (2019.01)

(52) U.S. Cl.
CPC ......... *G06Q 30/0204* (2013.01); *G06F 1/163* (2013.01); *G06F 16/24575* (2019.01); *G06F 16/9017* (2019.01); *G06Q 10/067* (2013.01)

(58) Field of Classification Search
CPC .............................. G06Q 30/02; G06Q 30/06
USPC ........................................................ 705/7.33
See application file for complete search history.

(56) References Cited

U.S. PATENT DOCUMENTS

| | | | | |
|---|---|---|---|---|
| 9,341,843 B2 * | 5/2016 | Border | ............... | G02B 27/0093 |
| 10,180,572 B2 * | 1/2019 | Osterhout | ........... | G02B 27/0093 |
| 2008/0249856 A1 * | 10/2008 | Angell | .................. | G06Q 30/02 705/14.67 |
| 2008/0249867 A1 * | 10/2008 | Angell | .................. | G06Q 30/02 705/14.26 |
| 2014/0052567 A1 * | 2/2014 | Bhardwaj | .......... | G06Q 30/0631 705/26.7 |
| 2014/0081682 A1 * | 3/2014 | Perlmuter | .......... | G06Q 30/0601 705/7.11 |
| 2014/0365334 A1 * | 12/2014 | Hurewitz | ........... | G06Q 30/0613 705/26.41 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Nga B Nguyen
(74) *Attorney, Agent, or Firm* — Joseph Petrokaitis, Esq.; McGinn IP Law Group, PLLC

(57) ABSTRACT

A reality augmenting computer-implemented method, system, and computer program product, includes detecting a consumer and at least one of a product and a location, determining a current sensory state of the consumer, calculating a desired sensory state to achieve a target mood based on a correlation between the target mood and a user model, and executing an action according to the desired sensory state by a wearable to change the current sensory state of the consumer to the target mood.

18 Claims, 4 Drawing Sheets

(56) References Cited

U.S. PATENT DOCUMENTS

| | | | |
|---|---|---|---|
| 2015/0073907 A1* | 3/2015 | Purves | G06Q 20/32 |
| | | | 705/14.58 |
| 2016/0026253 A1* | 1/2016 | Bradski | G02B 27/225 |
| | | | 345/8 |
| 2016/0057565 A1* | 2/2016 | Gold | H04L 67/12 |
| | | | 455/41.1 |
| 2016/0110782 A1* | 4/2016 | Tadajewski | G06Q 30/0601 |
| | | | 705/14.37 |
| 2016/0358247 A1* | 12/2016 | Majumdar | G06Q 30/08 |
| 2017/0017998 A1* | 1/2017 | Dhawan | G06Q 30/0255 |
| 2017/0188807 A1* | 7/2017 | Swital | G06Q 30/0621 |
| 2018/0242887 A1* | 8/2018 | Dong | A61B 5/16 |

\* cited by examiner

SYSTEM, METHOD AND COMPUTER PROGRAM PRODUCT FOR REALITY AUGMENTING TOWARDS A PREDEFINED OBJECT

BACKGROUND

The present invention relates generally to a reality augmenting method, and more particularly, but not by way of limitation, to a system, method, and computer program product for augmenting reality to modify a user's mood associated with a predefined object.

A mood of a person can affect their purchasing habits and mental health. Music, lighting, smells, and coloring (e.g., sensory inputs) all may effect mood.

Conventionally, stores attempt to create a mood while in a store to encourage or discourage particular consumer behavior. For example, the selection of music in a clothing store can make a consumer associate the clothing in that store with a particular sub-culture style to encourage the user to make a purchase. In addition, the colors and lighting used in fast food outlets can encourage the consumption of food by the consumer.

There is a need in the art to adjust a consumer's mood to a particular product and or alternative products via subtly augmenting reality.

For example, some conventional techniques have considered color scheme and lighting changes in a store to manipulate the user's overall mood to increase the likelihood that a user purchases a product. However, the prior techniques may merely adjust a mood without consideration of a particular product, which creates the exemplary technical problem that the user's mood is not focused to increase sales of a particular product even if the mood may be generally changed to purchase more items. Thus, a large retail store may benefit from the conventional techniques but a merchant of a particular product competing with other merchants in a large retail store cannot gain any advantage using the conventional techniques.

SUMMARY

In an exemplary embodiment, the present invention can provide a computer-implemented reality augmenting method, the method including detecting a consumer and at least one of a product and a location, determining a current sensory state of the consumer, calculating a desired sensory state to achieve a target mood based on a correlation between the target mood and a user model, and executing an action according to the desired sensory state by a wearable to change the current sensory state of the consumer to the target mood.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
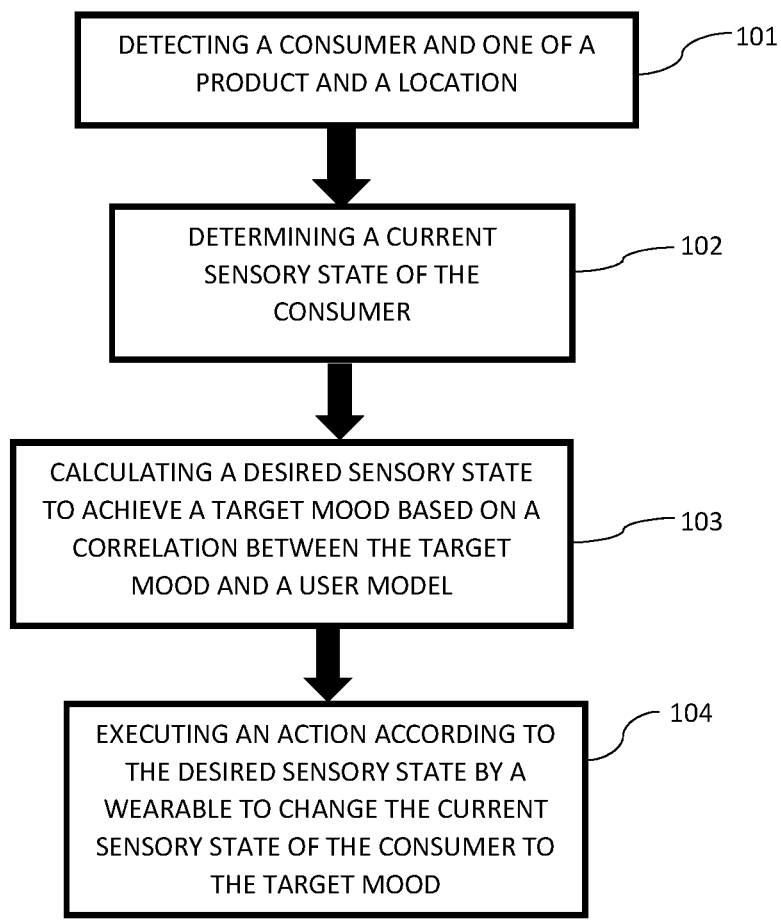
FIG. 1 depicts a high-level flow chart for a reality augmenting method according to an embodiment of the present invention.

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a reality augmenting method 100 according to an embodiment of the present invention includes various steps to facilitate an augmentation of reality to modify a mood of a user towards a predefined object. As shown in at least FIG. 2, one or more computers of a computer system 12 according to an embodiment of the present invention may include a memory 28 having instructions stored in a storage system to perform the steps of FIG. 1.

Thus, a reality augmenting method 100 according to an embodiment of the present invention may act in a more sophisticated and useful fashion, and in a cognitive manner while giving the impression of cognitive mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that are generally agreed as cognitive.

Figure 2:
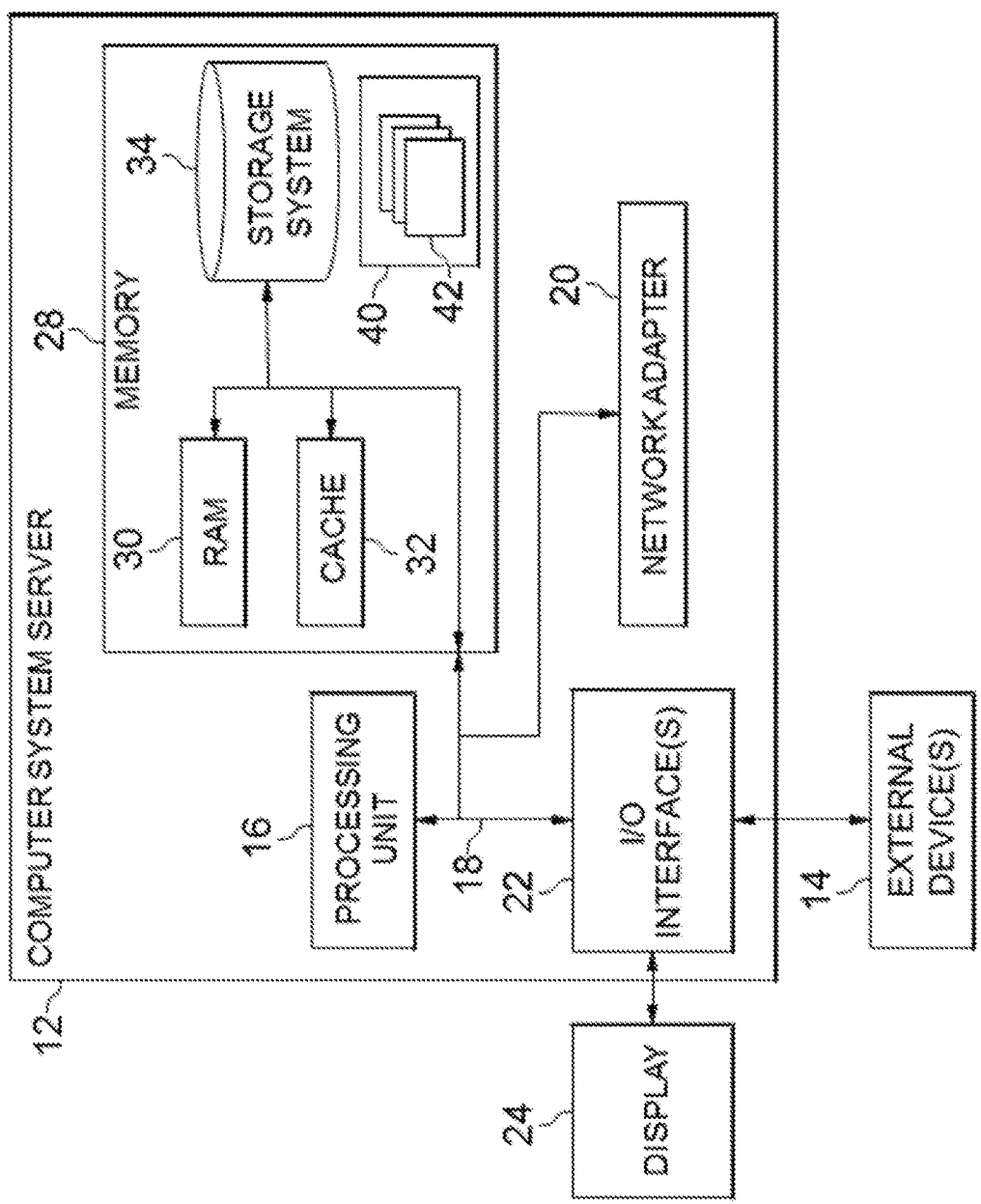
FIG. 2 depicts a cloud computing node according to an embodiment of the present invention.
Figure 3:
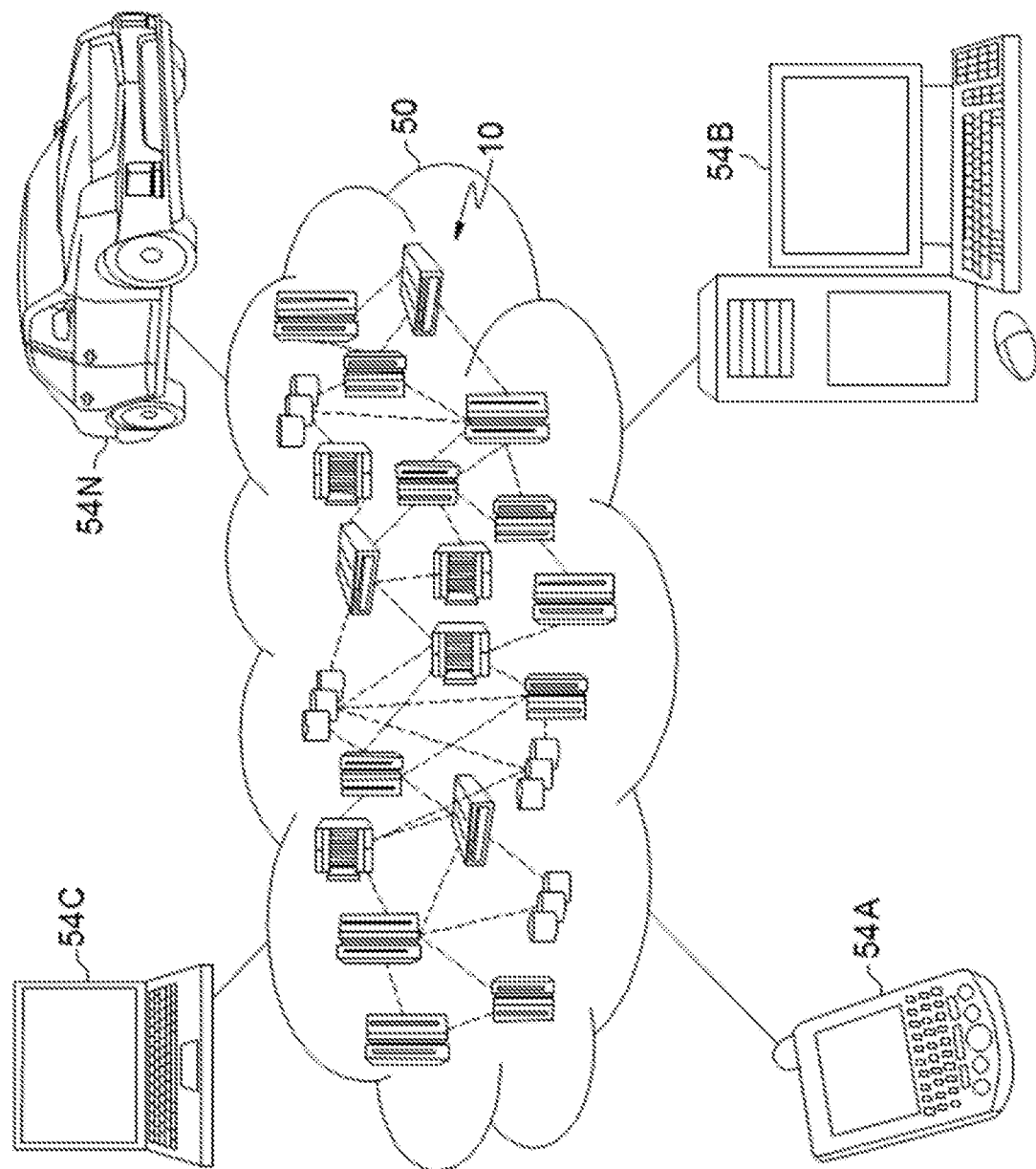
FIG. 3 depicts a cloud computing environment according to an embodiment of the present invention.

As will described/illustrated herein, one or more embodiments of the present invention (see e.g., FIGS. 2-4) may be implemented in a cloud environment 50 (see e.g., FIG. 3). It is nonetheless understood that the present invention can be implemented outside of the cloud environment.

Referring now to FIG. 1, in step 101, a consumer and one of a product and a location are detected. In some embodiments, the product, the consumer, or the location can be detected via a proximity sensor, a camera using video analytics, etc. That is, video analytics may be used to detect a plurality of unique objects in a store. Also, detection techniques including detecting a product based on a Radio-Frequency Identification (RFID) tag, Bluetooth sync detection between user and location, Quick Response (QR) codes, bar codes, unique identification marks, location services and/or Global Position System (GPS) coordinates, and other Radio frequency based location services may be used to assist and or provide identification of objects and or persons.

In other words, in step 101, a consumer is detected whose mood is to be calculated and changed (as described later) as relating to a product and/or location.

When the consumer is detected, a user model is retrieved for the consumer. A user model comprises a model of how the consumer's mood is effected by or likely to be effected by different alterations to their sensors (e.g., change in audio or lighting). The user model may include a model customized for the particular consumer (e.g., a personalized user model for that exact consumer such as a "John Doe" model for "John Doe") or the user model may include a model selected from a pool of predefined models that represent the average/typical consumer (e.g., a user model for a middle-aged male if the consumer is, a middle aged male).

Also, when the product and/or location is detected with which the consumer's mood is to be associated, a target mood for the product and/or location is retrieved. That is, once the product and/or location has been identified, a target mood for the consumer (e.g., a mood that encourages the user to purchase a product or enjoy a location, etc.) is retrieved from a data source or a plurality of data sources (e.g., a database).

In step 102, a current sensory state of the consumer is determined. In some embodiments, a wearable that the consumer is wearing is utilized to detect prior images, sounds, lighting, smell and/or other sensed stimuli that the user would reasonably be affected by in order to determine the current sensory state of the user. For example, a wearable such as a Heads-Up-Display (HUD), headphones, a personal light augmentation device, etc. may track the sensory signals that the consumer has recently consumed to determine a current sensory state of the consumer. That is, the consumer's recent exposure to sound, light, smell, etc. is tracked and is used to determine a current sensory state of the consumer.

In step 103, a desired sensory state required to achieve the target mood is calculated based on the target mood and the user model. In one embodiment, a determining function to calculate the desired sensory state may be a look-up on the user model based on the target mood. In other words, each user model may require a different sensory change to achieve the target mood for the consumer. For example, a sensory change for a child may be different from that of an adult as depicted in the user model to achieve the same target mood of being "content".

That is, a desired sensory state to achieve a target mood is calculated based on a correlation between the target mood and the user model.

In step 104, an action by the wearable to change the current sensory state of the consumer to the target mood is executed according to the calculated desired sensory state. That is, the desired sensory state comprises a state to exhibit on the consumer, which will cause the current sensory state of the consumer to approach the target mood. In other words, the desired sensory state comprises additive or subtractive actions (e.g., such as changing lighting, sounds, smells, etc.) to execute an alteration of the consumers current sensory state, thereby to provide the desired sensory state. The action executed in step 104 may include filtering undesirable light if the desired sensor state comprises an action to reduce total light or reduce light from a particular spectrum. In some embodiments, the action may include increasing a perception of warmth by changing the color temperature through the filtration of blue light. In other embodiments, the action may include playing a particular song in headphones of the consumer to change the current sensory state of the user to the target mood.

That is, an action is executed in step 104 according to the desired sensory state by a wearable to change the current sensory state of the consumer to the target mood. Thereby, the action augments the reality of the consumer (e.g., an environment perceived by the consumer) such that the mood of the consumer is changed to a target mood such that the user is encouraged to purchase the product or enjoy the location.

In some embodiments, the action may be executed using a Heads-Up-Display (HUD), a personal light augmentation device, headphones, etc. For example, HUDs and/or helmet-mounted displays allow critical information to be displayed to a user while they are focusing on the far-field, as opposed to the screen itself. This is frequently achieved by using a projector combined with a reflective prism or glass surface allowing the projected image to be combined with the incoming light from the far field. This approach may not significantly compromise the native vision of the user.

In some embodiments, the action may be executed by altering a visual appearance of the far-field using active and passive polarizing materials such as LCD lenses. Therefore, the light transmitted to each of the consumer's eyes can be regulated.

In some embodiments, the action selectively restricts the ability of the user to distinguish features within the far-field.

In one embodiment, a first consumer and a soft drink (e.g., a product) may be detected in step 101. A target mood for encouraging the consumer to buy the soft drink is retrieved as well as a user model for the first consumer. The current sensory state of the first consumer is determined according to recent determinations by an HUD being worn by the first consumer (e.g., step 102). A desired sensory state to execute on the HUD to achieve the target mood for the soft drink is calculated based on the target mood for the soft drink and the user model for the first consumer (e.g., step 103). That is, the desired sensory state comprises the actions required by the HUD in order to augment the first consumer's sensory state from the current sensory state to the target mood such that the first consumer is more likely to purchase the soft drink. The HUD changes a lighting perceives by the user and plays a particular sound (e.g., executing an action) to change the current sensory state of the first consumer to the target mood (e.g., step 104).

It is noted that in some embodiments, both a location and a product can be detected such that the desired sensory state comprises an action to achieve a target mood that is optimal for both of the location and the product.

Thus, the inventors have identified a technical solution to an exemplary technical problem of the need to adjust a consumer's mood to a particular product and or alternative products by executing an action by a wearable to change the current sensory state of the consumer to the target mood. Thereby, the technical solution can modify a person's mood to effect their purchasing habits and mental health towards a particular product such that even in large retail stores with competition, a particular product can be favored based on the user's mood.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
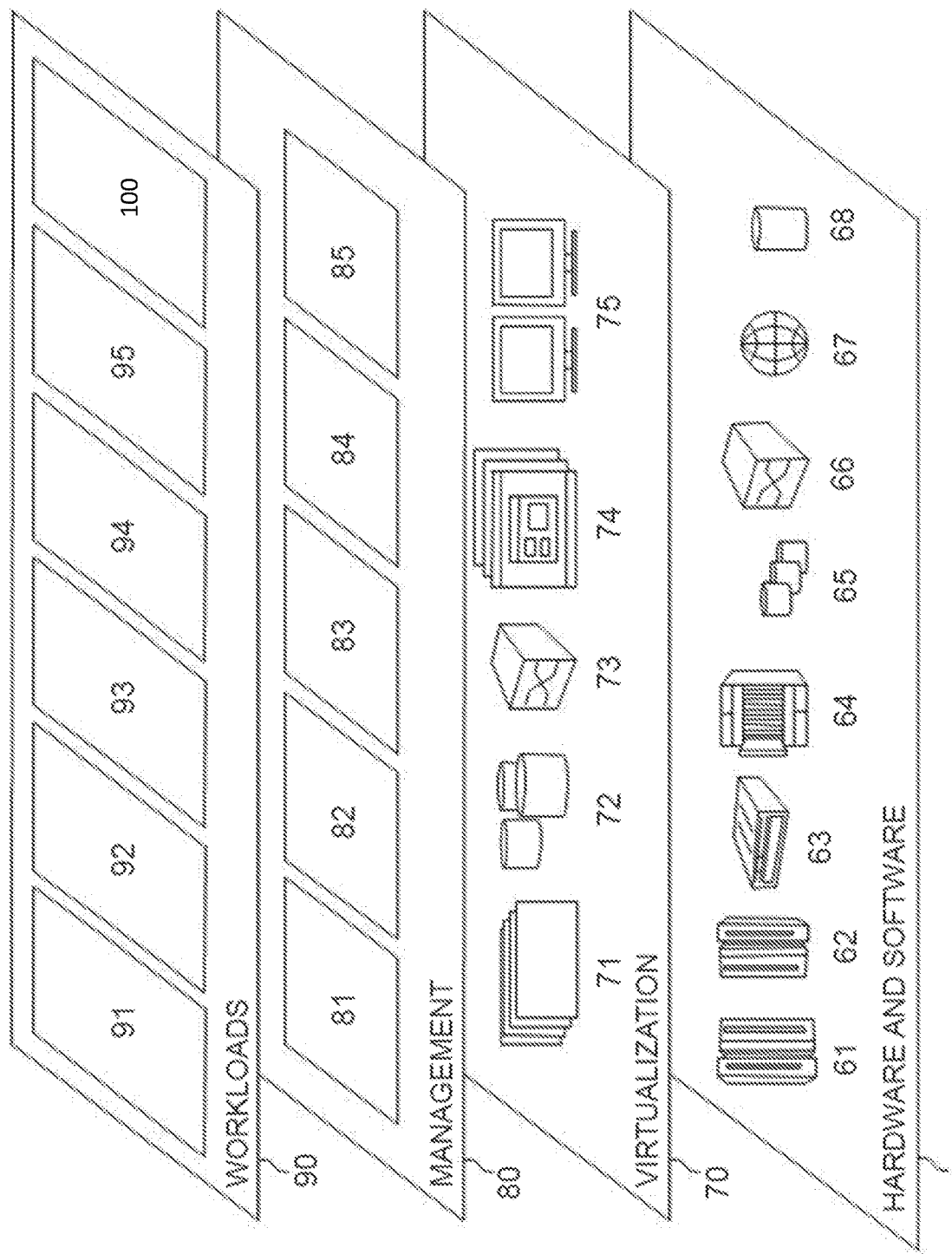
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and, more particularly relative to the present invention, the reality augmenting method 100.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented reality augmenting method, the method comprising:
   detecting a consumer, a product of a plurality of products, and a location associated with the product;
   determining a current sensory state of the consumer;
   calculating a desired sensory state to achieve a target mood based on a correlation between the target mood and a user model; and
   executing an action, that increases a desire for the product over other products of the plurality of products, according to the desired sensory state by a wearable to change the current sensory state of the consumer to the target mood,
   wherein the action is executed on a display screen of the wearable such that the action is displayed to the user in a near-field on the display screen without compromising a native vision of the user, the display screen being an optical see through screen,
   wherein the action increases the desire for both the product and the location associated with the product,
   wherein the display screen is disposed such that the user must view the far-field by looking through the near-field displayed on the optical see through screen of the display screen, and
   wherein the action is executed on the display screen of the wearable such that the action is displayed to the user in a near-field on the display screen without compromising the native vision of the user to focus on the product not on the display screen.

2. The computer-implemented method of claim 1, wherein the action augments a reality of the consumer by changing the current sensory state of the consumer to the target mood such that the user is encouraged to purchase the product over other products of the plurality of products.

3. The computer-implemented method of claim 1, wherein the user model comprises a model associating a result of the consumer's mood based on an alteration to the consumer's senses by the action.

4. The computer-implemented method of claim 3, wherein the user model is selected from a group consisting of:
   a personalized user model for a particular consumer; and
   a user model representing a cohort of consumers.

5. The computer-implemented method of claim 1, wherein the target mood comprises a predefined consumer state that increases an enjoyment of the product.

6. The computer-implemented method of claim 1, wherein the determining determines the current sensory state of the consumer according to past detected sensory signals by the wearable.

7. The computer-implemented method of claim 1, wherein the wearable is selected from a group consisting of:
   a headphone;
   a Heads-Up-Display (HUD); and
   a personal light augmentation device.

8. The computer-implemented method of claim 1, wherein the desired sensory state comprises an addition or a subtraction of a sensory change by the wearable according to the user model to achieve the target mood.

9. The computer-implemented method of claim 1, wherein the desired sensory state is based on a look-up table correlating the target mood with the user model such that the desired sensory state comprises the action to cause the current sensory state to change to the target mood.

10. The computer-implemented method of claim 1, wherein the desired sensory state comprises a state to exhibit on the consumer as the action such that the consumer's current sensory state is changed to the target mood.

11. The computer-implemented method of claim 1, embodied in a cloud-computing environment.

12. A computer program product for reality augmenting, the computer program product comprising a computer-readable storage medium having program instructions embodied therewith, the program instructions executable by a device to cause the device to perform:
   detecting a consumer, a product of a plurality of products, and a location associated with the product;
   determining a current sensory state of the consumer;
   calculating a desired sensory state to achieve a target mood based on a correlation between the target mood and a user model; and
   executing an action, that increases a desire for the product over other products of the plurality of products, according to the desired sensory state by a wearable to change the current sensory state of the consumer to the target mood,
   wherein the action is executed on a display screen of the wearable such that the action is displayed to the user in a near-field on the display screen without compromising a native vision of the user, the display screen being an optical see through screen,
   wherein the action increases the desire for both the product and the location associated with the product,
   wherein the display screen is disposed such that the user must view the far-field by looking through the near-field displayed on the optical see through screen of the display screen, and
   wherein the action is executed on the display screen of the wearable such that the action is displayed to the user in a near-field on the display screen without compromising the native vision of the user to focus on the product not on the display screen.

13. The computer program product for reality augmenting of claim 12, wherein the action augments a reality of the consumer by changing the current sensory state of the consumer to the target mood such that the user is encouraged to purchase the product over other products of the plurality of products.

14. The computer program product for reality augmenting of claim 12, wherein the user model comprises a model associating a result of the consumer's mood based on an alteration to the consumer's senses by the action.

15. The computer program product for reality augmenting of claim 14, wherein the user model is selected from a group consisting of:
   a personalized user model for a particular consumer; and
   a user model representing a cohort of consumers.

16. The computer program product for reality augmenting of claim 12, wherein the target mood comprises a predefined consumer state that increases an enjoyment of the product.

17. The computer program product for reality augmenting of claim 12, wherein the determining determines the current sensory state of the consumer according to past detected sensory signals by the wearable.

18. A reality augmenting system, comprising:
a processor; and
a memory, the memory storing instructions to cause the processor to perform:
  detecting a consumer, a product of a plurality of products, and a location associated with the product;
  determining a current sensory state of the consumer;
  calculating a desired sensory state to achieve a target mood based on a correlation between the target mood and a user model; and
  executing an action, that increases a desire for the product over other products of the plurality of products, according to the desired sensory state by a wearable to change the current sensory state of the consumer to the target mood,
wherein the action is executed on a display screen of the wearable such that the action is displayed to the user in a near-field on the display screen without compromising a native vision of the user, the display screen being an optical see through screen,
wherein the action increases the desire for both the product and the location associated with the product,
wherein the display screen is disposed such that the user must view the far-field by looking through the near-field displayed on the optical see through screen of the display screen, and
wherein the action is executed on the display screen of the wearable such that the action is displayed to the user in a near-field on the display screen without compromising the native vision of the user to focus on the product not on the display screen.

* * * * *